United States Patent
Gallagher

(10) Patent No.: US 11,733,209 B2
(45) Date of Patent: Aug. 22, 2023

(54) FLUID PROPERTY MEASUREMENT BY REFLECTION OF VIBRATIONAL WAVES

(71) Applicant: Hydramotion Limited, Malton (GB)

(72) Inventor: John Gallagher, Malton (GB)

(73) Assignee: HYDRAMOTION LIMITED, Malton (GB)

(*) Notice: Subject to any disclaimer, the term of this patent is extended or adjusted under 35 U.S.C. 154(b) by 329 days.

(21) Appl. No.: 16/768,730

(22) PCT Filed: Dec. 3, 2018

(86) PCT No.: PCT/GB2018/053491
§ 371 (c)(1),
(2) Date: Jun. 1, 2020

(87) PCT Pub. No.: WO2019/106391
PCT Pub. Date: Jun. 6, 2019

(65) Prior Publication Data
US 2021/0172847 A1    Jun. 10, 2021

(30) Foreign Application Priority Data

Dec. 1, 2017 (GB) .................................... 1720084

(51) Int. Cl.
*G01N 29/032* (2006.01)
*G01N 11/00* (2006.01)
(Continued)

(52) U.S. Cl.
CPC .......... *G01N 29/032* (2013.01); *G01N 11/00* (2013.01); *G01N 29/036* (2013.01);
(Continued)

(58) Field of Classification Search
CPC .... G01N 11/00; G01N 29/032; G01N 29/036; G01N 29/222; G01N 29/44;
(Continued)

(56) References Cited

U.S. PATENT DOCUMENTS

| | | | |
|---|---|---|---|
| 3,553,636 A | 1/1971 | Baird | |
| 4,509,360 A * | 4/1985 | Erwin | .................. G01N 29/221 73/61.79 |
| 5,157,962 A | 10/1992 | Fitzgerald | |
| 5,365,778 A | 11/1994 | Sheen et al. | |

(Continued)

FOREIGN PATENT DOCUMENTS

| | | |
|---|---|---|
| DE | 19944709 A1 | 4/2000 |
| DE | 10035624 A1 | 2/2002 |

(Continued)

OTHER PUBLICATIONS

PCT International Search Report and Written Opinion dated Mar. 11, 2019 for Intl. App. No. PCT/GB2018/053941, from which the instant application is based, 11 pgs.

*Primary Examiner* — Benjamin R Schmitt
(74) *Attorney, Agent, or Firm* — Fredrikson & Byron, P.A.

(57) ABSTRACT

Systems and techniques are described making use of a vibratory transducer and a reflector spaced from the vibratory transducer to form a cavity for receiving a fluid between the vibratory transducer and the reflector, wherein the vibratory transducer is vibrated to generate a wave in the cavity, which propagates through fluid in the cavity from a surface of the vibratory transducer and is being reflected by the reflector to generate a counter-propagating wave in the cavity. Based on the wave generated at the vibratory transducer and the counter-propagating wave generated at the reflector in combination, an indication of the energy returned to the vibratory transducer by the reflector is determined. One or more material properties of the fluid are determined based on the determined indication of the energy returned to the vibratory transducer.

12 Claims, 5 Drawing Sheets

(51) Int. Cl.
- *G01N 29/036* (2006.01)
- *G01N 29/22* (2006.01)
- *G01N 29/44* (2006.01)

(52) U.S. Cl.
CPC ........... *G01N 29/222* (2013.01); *G01N 29/44* (2013.01); *G01N 2011/0073* (2013.01); *G01N 2291/014* (2013.01); *G01N 2291/022* (2013.01); *G01N 2291/02818* (2013.01); *G01N 2291/045* (2013.01); *G01N 2291/101* (2013.01)

(58) Field of Classification Search
CPC ..... G01N 2011/0073; G01N 2291/014; G01N 2291/022; G01N 2291/02818; G01N 2291/045; G01N 2291/101
See application file for complete search history.

(56) References Cited

U.S. PATENT DOCUMENTS

| | | | |
|---|---|---|---|
| 6,182,499 B1* | 2/2001 | McFarland | C40B 30/08 506/13 |
| 6,216,544 B1* | 4/2001 | Adachi | G01F 1/662 73/861.25 |
| 6,227,040 B1 | 5/2001 | Hastings et al. | |
| 6,823,720 B1* | 11/2004 | Adkins | G01N 29/222 73/579 |
| 2017/0168020 A1 | 6/2017 | Omata | |

FOREIGN PATENT DOCUMENTS

| | | |
|---|---|---|
| DE | 102011115691 A1 | 4/2013 |
| RO | 127984 A2 | 11/2012 |

* cited by examiner

FLUID PROPERTY MEASUREMENT BY REFLECTION OF VIBRATIONAL WAVES

RELATED APPLICATIONS

This application is a 35 U.S.C. 371 national stage filing from International Application No. PCT/GB2018/053491, filed Dec. 3, 2018, which claims priority to British Application No. 1720084.1, filed Dec. 1, 2017, the teachings of which are incorporated herein by reference.

TECHNICAL FIELD

This disclosure relates to obtaining measurements of physical and rheological properties of materials, including obtaining a measurement of the zero-shear viscosity of a material.

BACKGROUND

In a Newtonian fluid, the shear stress is directly proportional to the shear rate, the constant of proportionality being the viscosity of the fluid. Therefore the viscosity as a single parameter can be used to model or define the relationship between shear stress and shear rate of the fluid, and therefore the flow behaviour of Newtonian fluids. Water is an example of a Newtonian fluid.

In a non-Newtonian fluid, the relationship between shear stress and shear rate is not so simple. The apparent viscosity of the fluid is found to vary with, for example, the shear stress or the shear rate. Fluids that exhibit non-Newtonian behaviour include tomato ketchup, mayonnaise and paint. The study of the flow of these types of fluids is the field of 'rheology'.

Rheological properties of Newtonian and non-Newtonian fluids are traditionally determined using a rheometer or viscometer.

These devices utilise a variety of measurement techniques but one favoured approach is to provide an oscillatory stimulus to the fluid and measure the fluid mechanical response to determine viscoelastic parameters such a storage modulus, loss modulus, viscosity and loss tangent.

In such devices the test fluid is held in a gap between two controlled surfaces. The oscillatory movement of one or the other surfaces gives rise to a shear wave which progresses though the fluid. According to the state of the art, there are two well-defined modes in which these devices work.

The first mode is 'Gap Mode'. In this mode, the wavelength of the emanating wave is long compared to the gap between the two surfaces holding the sample. The shear rate, which is critical to the analysis, is determined simply by the velocity at the drive surface and the length of the gap and the velocity field is largely unaffected by the propagating wave.

The second mode is 'Surface Loading Mode'. In this mode, the gap is so wide that the wave emanating from the drive surface dissipates before it reaches the second surface and the velocity distributions formed in the sample follow wave theory.

SUMMARY

In addition to 'Gap Mode' and 'Surface Loading Mode' as discussed above, the inventors have identified a third mode. The third mode is termed Cavity Mode in this disclosure, and the techniques of this disclosure exploit the Cavity Mode.

Aspects of the invention include methods, systems, and computer-readable medium having stored thereon instructions, as set out in the accompanying independent claims, wherein the systems may be embodied as apparatus and/or a kit.

For example, as a first aspect of the invention there is provided a method of determining a material property of a viscoelastic fluid using a vibratory transducer and a reflector spaced from the vibratory transducer to form a cavity for receiving a fluid, the method comprising; vibrating the vibratory transducer to generate a wave in the cavity, the wave propagating through fluid in the cavity from a surface of the vibratory transducer; reflecting, by the reflector, the wave propagated from the surface of the vibratory transducer to generate a counter-propagating wave in the cavity; determining, based on the wave generated at the vibratory transducer and the counter-propagating wave generated at the reflector in combination, an indication of the energy returned to the vibratory transducer by the reflector; determining, based on the determined indication of the energy returned to the vibratory transducer, one or more material properties of the fluid.

As a second aspect of the invention there is provided a computer-readable medium having stored thereon instructions that, when executed by the processor of a system, cause the system to carry out the above-described method.

As a third aspect of the invention there is provided a device for determining one or more material properties of a fluid using a vibratory transducer and a reflector—a surface for reflecting waves—spaced from the vibratory transducer to form a cavity for receiving a fluid between the vibratory transducer and the reflector, the device being configured to, based on a vibratory transducer vibrating to generate a wave in the cavity, the wave propagating through fluid in the cavity from a surface of the vibratory transducer, the wave propagated from the surface of the vibratory transducer being reflected by the reflector to generate a counter-propagating wave in the cavity: determine, based on the wave generated at the vibratory transducer and the counter-propagating wave generated at the reflector in combination, an indication of the energy returned to the vibratory transducer by the reflector; and determine, based on the determined indication of the energy returned to the vibratory transducer, one or more material properties of the fluid. The device may be configured to cause the vibratory transducer to vibrate or the vibratory transducer may be caused to vibrate by some other means. The device may comprise one or more of: circuitry, a mechanism, a processor such as a CPU or GPU, a memory, a display, an FPGA, and an ASIC. The device may be included within a system comprising the vibratory transformer and reflector.

As a fourth aspect of the invention there is provided a system, the system comprising: a vibratory transducer; a reflector spaced from the vibratory transducer to form a cavity for receiving a fluid; means for vibrating the vibratory transducer to generate a wave in the cavity, the wave propagating through fluid in the cavity from a surface of the vibratory transducer, and for reflecting, by the reflector, the wave propagated from the surface of the vibratory transducer to generate a counter-propagating wave in the cavity; means for determining, based on the wave generated at the vibratory transducer and the counter-propagating wave generated at the reflector in combination, an indication of the energy returned to the vibratory transducer by the reflector; means for determining, based on the determined indication of the energy returned to the vibratory transducer, one or more material properties of the fluid.

As a fifth aspect of the invention there is provided a system, the system comprising: a vibratory transducer, a reflector spaced from the vibratory transducer to form a cavity for receiving a fluid between the vibratory transducer and the reflector; a device—such as a controller—configured to: vibrate the vibratory transducer to generate a wave in the cavity, the wave propagating through fluid in the cavity from a surface of the vibratory transducer, the wave propagated from the surface of the vibratory transducer being reflected by the reflector to generate a counter-propagating wave in the cavity; determine, based on the wave generated at the vibratory transducer and the counter-propagating wave generated at the reflector in combination, an indication of the energy returned to the vibratory transducer by the reflector; and determine, based on the determined indication of the energy returned to the vibratory transducer, one or more material properties of the fluid. The device or controller may comprise one or more of: circuitry, a mechanism, a processor such as a CPU or GPU, a memory, a display, an FPGA, and an ASIC.

In the above-described aspects of the invention, the one more material properties of the fluid may be determined based on the determined indication of the energy returned to the vibratory transducer and a viscoelastic model.

Alternatively or additionally the determined indication of the energy returned to the vibratory transducer by the reflector may be the quality factor of the vibratory transducer. The zero shear viscosity may be determined using the determined quality factor and a viscoelastic model, the viscoelastic model relating the determined quality factor and the zero shear viscosity. The viscoelastic model may provide an increasing zero shear viscosity with increasing quality factor.

The molecular weight of the fluid may be determined using the determined quality factor and the viscoelastic model, the viscoelastic model relating the determined quality factor and the molecular weight of the fluid. The viscoelastic model provides an increasing molecular weight with increasing quality factor.

The quality factor is determined using one of: frequency bandwidth, amplitude, and logarithmic decrement.

The determined indication of the energy returned to the vibratory transducer by the reflector may be the resonant frequency of the vibratory transducer. The determined indication of the energy returned to the vibratory transducer by the reflector may be the change in resonant frequency of the vibratory transducer resulting from the counter-propagating wave in the cavity. Alternatively or additionally the zero shear viscosity is determined using the frequency and a viscoelastic model, the viscoelastic model relating the frequency and zero shear viscosity. The viscoelastic model may provide an increasing zero shear viscosity as the resonant frequency of the vibratory transducer decreases. Or the viscoelastic model may provide an increasing zero shear viscosity as the resonant frequency of the vibratory transducer increases.

The molecular weight of the fluid may be determined using the determined change in frequency and the viscoelastic model, the viscoelastic model relating the determined change in frequency and the molecular weight of the fluid. The viscoelastic model may provide an increasing molecular weight as the resonant frequency of the vibratory transducer decreases.

The fluid may be a polymer fluid such as a polymer melt.

The wave generated in the cavity by the vibratory transducer is a shear wave. Alternatively, or additionally, a compression wave may be generated in the cavity by the vibratory transducer.

The vibratory transducer may be a tube in which the interior surface of the tube provides both the vibrating surface and reflector.

The reflector may be provided with a frustrated surface on the cavity interior to reduce the reflection efficiency.

The position of the reflector may be modulated relative to the vibratory transducer to provide a phase adjustment.

The vibratory transducer and reflector may be located in static fluid, having no bulk flow rate, or in flowing fluid. Fluid may flow through the cavity and measurements be taken over an extended period of time, e.g. periodically at a desired sampling rate, to continuously monitor the material properties of the flowing fluid. The vibratory transducer and reflector may be located in-line in a process, with the measurements of the material properties logged and/or used as inputs to a control system to control the process.

A system may comprise one or more transducers and one or more reflectors. For example, a system may comprise a single transducer with multiple reflectors, or multiple transducers sharing a single reflector, or multiple transducers and multiple reflectors, including equal or different numbers of transducers and reflectors. Different transducers may be tuned to different ranges of material properties. A device may take measurements from multiple transducers and either combine the measurements from the transducers or perform separate operations on the measurements from the transducers and combine the results of the operations in determining the material properties of the fluid.

Embodiments of the invention may provide certain advantages. In particular, such embodiments may overcome limitations with current surface loaded techniques caused by uncontrolled shear wave propagation in highly viscoelastic media.

In addition, such embodiments may have improved viscosity range. This is provided by the Q-factor increasing with increasing viscosity. For traditional techniques, the increase in viscosity leads to a decrease in Q-factor, which reduces resonator stability (reducing the amplitude and sharpness of the resonant peak makes it more difficult to phase-lock on the resonant frequency and maintain frequency stability) and signal-to-noise ratio and so limits the viable viscosity range.

In addition, such embodiments may allow the measurement of low-shear or zero-shear parameters, which are otherwise difficult to obtain. The techniques of this disclosure make use of a correlation between shear wave velocity and zero-shear viscosity and material relaxation times. Therefore the techniques avoid the limitations of current resonant viscosity measurement where the viscosity value is typically obtained at a high shear rate. It is therefore able to better monitor the low shear material performance by providing equivalent zero-shear viscosity, potentially in real time in an industrial environment.

Furthermore, the techniques are not themselves required to operate at low vibrational frequency while obtaining the low-shear or zero-shear parameters. Instead the techniques may operate at a relatively high frequency. This is advantageous in industrial environments where there is typically a high energy density of low frequency plant vibration, and so higher signal fidelity may be obtained.

Embodiments of the invention may be constructed to have no moving parts, making such embodiments suitable for long service with minimal maintenance compared with devices having moving parts.

Embodiments of the invention may be manufactured at a variety of scales since the principle behind the invention is scalable. For example, embodiments of the invention may vary from MEMs devices to larger scale devices up to devices up to one or several metres in length or more.

Embodiments of the invention may be provided as a complete apparatus and/or as a kit of parts, which may optionally exclude an explicit reflector component, as may be appropriate where the reflection functionality is to be provided by a component in place at the installation site for the apparatus, such as when the reflection is to be provided by a tank or pipe wall or other existing plant component, the cavity oscillation to be generated between the oscillator or vibratory transducer and the tank or pipe wall.

Furthermore, the techniques of this disclosure may be applied to either resonant devices or conventional oscillatory rheometers. Cavity oscillation can also be detected through loading on the drive oscillator as modulated stress/strain from transducers in forced oscillation rheometers.

The invention may be viewed or categorized as a type of cavity resonator in which vibrations of the fluid within the cavity reveal material properties of the fluid. In this way, the invention may sit alongside other cavity resonators, including acoustic instruments, and electromagnetic wave cavity resonators such as the klystron or magnetron, the maser and the laser.

BRIEF DESCRIPTION OF THE DRAWINGS

The invention will be described in more detail by way of example only with reference to the accompanying drawings, in which.

DETAILED DESCRIPTION

As discussed above, vibratory transducers, rheometers, and viscometers have been traditionally operated in either a 'Gap Mode' or a 'Surface Loading Mode'. The inventors have identified a third mode. The third mode is termed Cavity Mode in this disclosure, and the techniques of this disclosure exploit the Cavity Mode.

In the Cavity Mode, the gap is set so that the emanating wave is allowed to traverse to the second surface and reflect as a counter-propagating wave. By choosing suitable apparatus architectures and dimensions the progression towards either regenerative or degenerative oscillation is encouraged. The superposition of the two waves and the resultant energy profile is favourably exploited by the invention to return material properties. Further variations of the invention allow for the modulation of the cavity architecture or for specific forms of secondary surface to create either effective reflectors, or oppositely, frustrate the wave.

Newtonian fluids are purely viscous, possessing no appreciable elasticity. As such, a shear wave emanating from an oscillating surface dissipates relatively quickly at a short distance into the media. At low frequencies or high viscosity the wave depth is usually sufficiently long to fulfil the criteria for gap mode and this is the requirement for oscillatory-based gap rheometers.

At higher frequencies the wave depth reduces significantly and surface loading criteria is fulfilled; this mode is used by resonant viscometers, where the wave simply dissipates into a semi-infinite medium. The dissipation of wave energy presents as a damper to a resonating oscillator. The viscometer measures viscosity by correlating the damping effect through, for example, change of amplitude or Q-factor of the resonator.

Non-Newtonian fluids possess a degree of elasticity in addition to viscosity. The elastic behaviour is defined by the fluid's storage modulus and has the effect of both increasing the shear wavelength and the penetration depth in the fluid. The variation of wavelength and penetration depth gives rise to a more complex damping effect and the measured viscosity becomes shear-rate, or frequency, dependent and will deviate from the viscosity at another shear rate, but a scalable correlation can exist between the two.

In highly elastic, very non-Newtonian fluids, the wavelength and penetration depths are large enough to make it difficult to resolve a viable viscosity reading and the measurement reliability is therefore compromised.

The techniques of this disclosure enable the measurement of rheology of highly viscoelastic fluids. In particular, the techniques of this disclosure make use of the extended wavelengths and propagation depths of highly viscous or elastic fluids that would compromise conventional techniques.

Figure 1:
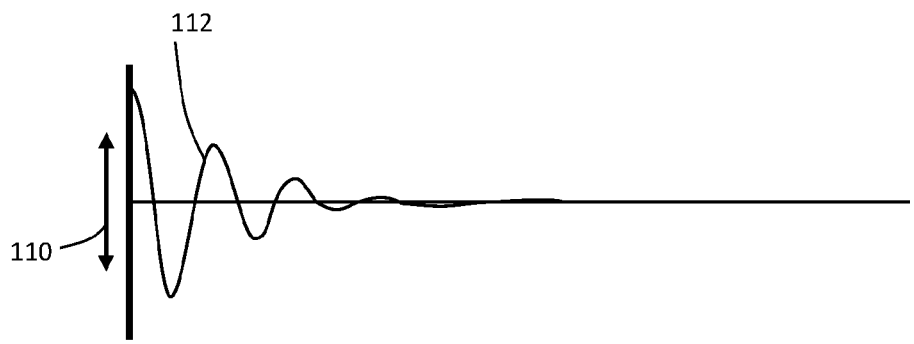
FIG. 1 illustrates a transmitted wave in a semi-infinite weakly viscoelastic or Newtonian fluid.
Figure 2:
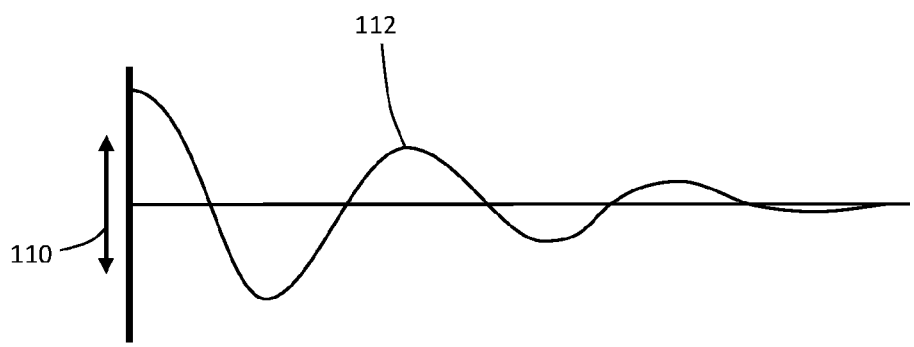
FIG. 2 illustrates a transmitted wave in a semi-infinite viscoelastic fluid.

FIG. 1 and FIG. 2 illustrate the propagation of a shear wave into a semi-infinite medium. FIG. 1 illustrates the damping of a shear wave 112 propagating a short distance from a vibrating surface 110 (that is oscillating in-plane) into a semi-infinite, low elasticity, viscous medium. After a short distance, the wave is dissipated. As viscoelasticity increases, the wavelength and penetration depth also increases, extending the propagation depth of the shear wave 112 into the fluid as shown in FIG. 2.

Figure 3:
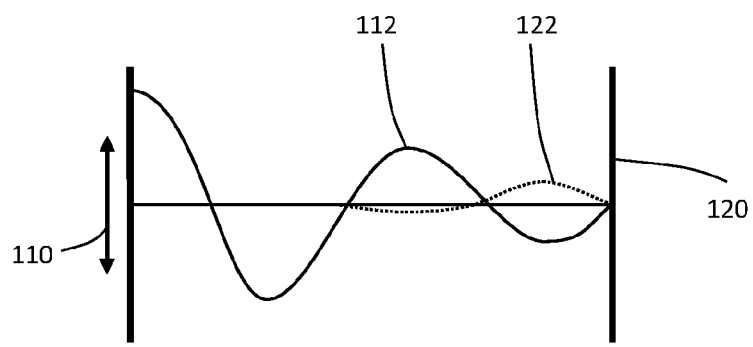
FIG. 3 illustrates a transmitted wave in a cavity formed by a reflector viscoelastic fluid.

In accordance with the techniques of this disclosure, a reflector 120 is located at some distance from the vibrating surface 110, creating a gap and forming a cavity. This configuration is illustrated in FIG. 3. Where the rheological properties of the fluid and vibration frequency create a wavelength and penetration depth sufficiently long to cross the gap between the vibrating surface 110 and the reflector 120, the transmitted wave 112 will be incident on the reflector and reflect back as a counter-propagating wave 122.

Figure 4:
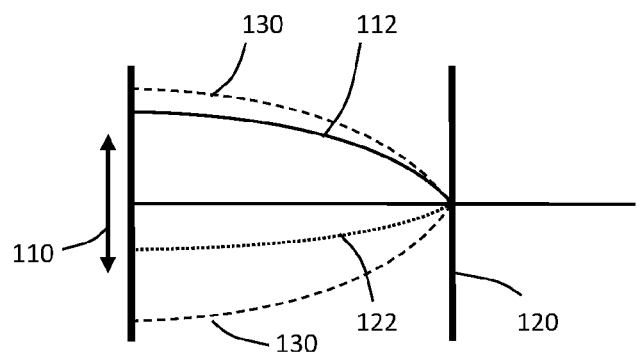
FIG. 4 illustrates the formation of standing wave in the cavity by tuned wavelength.

As illustrated in FIG. 4, a standing wave 112, 122 will form at sufficiently long propagation depths, returning energy to the vibrating surface 110 of the resonator, the envelope of the standing wave being indicated by reference 130.

The quality factor or Q-factor is a dimensionless parameter that describes how underdamped an oscillator or resonator is, and characterizes a resonator's bandwidth relative to its centre frequency. Higher Q-factor indicates a lower rate of energy loss relative to the stored energy of the resonator; the oscillations die out more slowly than at a lower Q-factor.

By forming a standing wave and returning energy to the resonator, the rate of energy loss relative to the stored energy of the resonator is reduced, leading to a higher Q-factor.

Further increasing viscoelasticity increases the wave speed which, in turn, increases the wavelength. Larger wavelengths bridge the cavity more effectively, driving up energy regeneration. This is detected by the increase in resonator Q-factor. Full coupled standing wave cavity resonance is achieved when the gap is an odd integer multiple of quarter wavelengths.

As the fluid becomes more Newtonian in character, the wavelengths shorten, cavity regeneration decreases and the Q-factor decreases. At even shorter wave propagation distances, the wave ceases to propagate to the reflector and so reflection does not take place and so the system returns to a classical surface loaded dissipative model where viscosity is inversely proportional to Q-factor.

Figure 5:
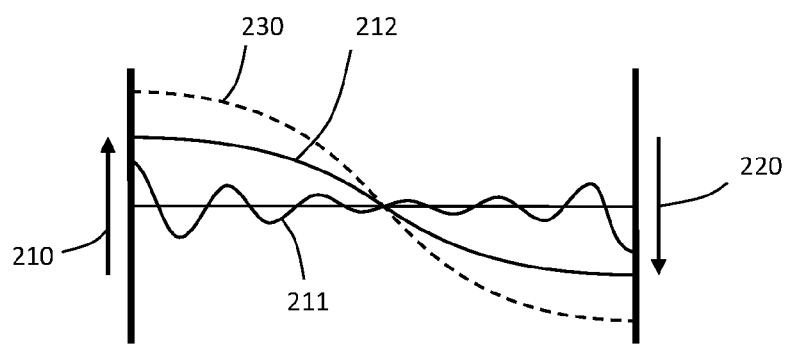
FIG. 5 illustrates the formation of standing wave in tube by symmetrical diametric emission.

A variation on this model is the cavity interference in a tube torsionally rotating about its axis. In this case, the inner wall of the tube is a transmitting surface with diametrically opposite sides 210, 220 at 180 degree phase separation. FIG. 5 illustrates the formation of a standing wave across the diameter of a tube, termed herein as symmetrical diametric emission. As the shear wavelength increases, constructive superposition occurs with the waves transmitted across the tube. The same effect can be observed using longitudinal and lateral modes, which generate internal shear and compression waves in the fluid in the tube. In FIG. 5 a dissipated wave 211 is shown and a conserved wave 212 is shown, as well as a standing wave envelope 230

In the above cases, the dissipative semi-infinite fluid model applies at short wavelengths, where viscosity is correlated with the inverse of Q-factor. The above-described regenerative cavity model applies at longer wavelengths, where the wave energy is conserved and viscoelastic loss modulus (viscosity) and storage modulus are correlated directly proportional to Q-factor.

Without wishing to be bound by theory, it is believed that the basis of the formation of the counter-propagating wave is that a no-slip condition is imposed at the reflective surface and the velocity at that point must be zero. This requires that the free wave which previously followed a trigonometric function (sine) becomes defined by a hyperbolic function (sinh) within the cavity, which creates a zero velocity at the reflector thus allowing the favourable 180 degree phase flip for the counter propagating wave needed for regeneration; see, for example, Lindley B. S. et al (2012) "Spatial stress and strain distributions of viscoelastic layers in oscillatory shear", Mathematics and Computers in Simulation vol. 82, Issue 7, March 2012, pp. 1249-1257, e.g. section 2 "Phasic strain-induced stress envelopes in the upper connected Maxwell model" onwards; see also Mitran et al (2008) "Extensions of the Ferry shear wave model for active linear and nonlinear microrheology", Journal of Non-Newtonian Fluid Mechanics, vol 154, Issues 2-3, October 2008, pp. 120-135, e.g. section 3.1, "Viscous fluid solution".

Further rheological analysis benefits can be derived by violating the zero slip, or efficient reflection, condition and introducing at the reflector what is termed herein a 'frustrated surface'. In particular, the reflector is provided with an irregular surface which means shear waves will strike the reflector at angles non-normal to the local surface and will be deflected from the incident axis at different angles across the reflector surface, causing a scattering effect.

Changes to resonator Q-factor or frequency can be correlated with modified energy dissipation caused by wavefronts colliding destructively with the complex surface.

In addition, further benefits to the control of the resonator for understanding the standing wave parameters in the cavity can be provided by modulating the gap, i.e. providing a periodic variation to the distance between the oscillating surface and reflector, while the shear waves are propagating in the cavity. This is equivalent to modulating the wavelength causing relative changes to Q-factor or resonant frequency by selective tuning of the cavity.

The energy gain of the cavity-coupled oscillator is a function of shear wavelength which is itself a function of zero shear viscosity, $\eta_0$, relaxation time, $\lambda_0$, and frequency, $\omega$, (based on the Upper-convected Maxwell model). In the case of polymers the molecular weight, Mw, is known to be a function zero shear viscosity, $\eta_0$. We therefore observe a number of relationships between the measured oscillator parameters, particularly quality-factor, Q, and the physical properties of the fluids:

In the surface-loaded mode (unstimulated cavity mode), i.e. gap is large compared to shear wave propagation and the wave emanating from the driving surface dissipates before it reaches the second surface, the viscosity at a frequency $\omega$ may be expressed as a polynomial in terms of the inverse of the measured resonator Q-factor, for example by:

$$\eta(\omega) = \{a_0 + a_1 \cdot L + a_2 \cdot L^2 + a_3 \cdot L^3 + \ldots + a_n \cdot L^n\}$$

where L is the inverse of Q, the measured resonator Q-factor, $\rho$ is the density, and $a_0 \ldots a_n$ are scaling constants.

In the cavity-loaded mode, the zero-shear viscosity can be expressed as a polynomial in terms of the measured resonator Q-factor, for example by the following viscoelastic model:

$$\eta_0 = \{b_0 + b_1 \cdot Q + b_2 \cdot Q^2 + b_3 \cdot Q^3 + \ldots + b_n \cdot Q^n\}$$

where $b_0 \ldots b_n$ are scaling constants.

In the cavity-loaded mode the molecular weight Mw of a polymer melt can also be expressed in as a polynomial in terms of the measured resonator Q-factor, for example by:

$$Mw = \{c_0 + c_1 \cdot Q + c_2 \cdot Q^2 + c_3 \cdot Q^3 + \ldots + c_n \cdot Q^n\}$$

where $c_0 \ldots c_n$ are scaling constants. This is because there a known relationships in the polymer-melt field linking zero shear viscosity to molecular weight—one such example is the expression $$\log(\eta_0) = 3.4 \log(Mw),$$

valid over a wide range of molecular weights. The skilled reader will recognize other relationships exist in the literature and may be applicable depending on the particular application of these techniques, such as depending on the particular fluid being measured.

The scaling constants can be obtained by calibration with one or more fluids of known viscosities at zero shear or known molecular weights, corrected for density where appropriate, with the number of terms of the polynomial selected according to desired accuracy over the desired operating range. It has been found by experience that the relationship between zero shear viscosity and Q-factor is well-behaved, and in practice it appears that zero shear viscosity as a function of Q-factor is continuous and monotonic. Thus the skilled reader will recognize that it is straightforward to model such a function using the polynomial approximations set out above, and the choice of number of terms will be made in the knowledge Thus, in the cavity-loaded mode, it may be possible to evaluate the zero-shear viscosity as a function of the measured resonator Q-factor. It may also be possible to evaluate the molecular weight of a polymer melt as a function of the measured resonator Q-factor.

The skilled reader will recognize that other approaches to approximating the relationship between $\eta_0$ (or Mw, which varies with $\eta_0$). For example, the relationship can be approximated using piecewise interpolation over multiple Q regions, such as piecewise linear interpolation or piecewise polynomial interpolation, such as by splines, cubic or otherwise. The relationship can also be approximated using interpolation using other basis functions, and by interpolation of rational functions such as by a Padé approximant.

As discussed above, the cavity mode can not only cause quality factor to increase with increased zero shear viscosity (correlated with increased Mw for polymer liquids such as polymer melts). The resonant frequency can also be affected. The change in quality factor is also accompanied by a change in resonant frequency due to increased coupling of inertial mass and/or fluid elasticity to the resonator. This may lead to a decrease in resonant frequency correlating with increased zero shear viscosity. Alternatively or additionally, in some circumstances, this may lead to an increase in resonant frequency correlating with increased zero shear viscosity. Frequency can therefore also be used as an indication of cavity wave formation. Therefore, as with the quality factor, the relationship between frequency and zero shear viscosity or Mw can be approximated using a viscoelastic model similar to those set out above with regard to the quality factor. As with the quality factor, such viscoelastic models are not required to use the polynomial form set out above, and the relationship can be approximated using piecewise interpolation over multiple frequency bands, such as piecewise linear interpolation or piecewise polynomial interpolation, such as by splines, cubic or otherwise. The relationship can also be approximated using interpolation using other basis functions, and by interpolation of rational functions such as by a Padé approximant.

To put the invention into effect, a cavity is coupled to an oscillator.

The oscillator can be a resonator operating at, or near its resonant frequency such as that used in vibrational instrumentation, for example a Hydramotion XL7 resonant viscometer, produced by Hydramotion Ltd. of Malton, United Kingdom.

Alternatively, the oscillator can be a forced-vibration device such as the EKT-100H model oscillating disc rheometer of Ekron Tek Co. Ltd. of Tianzhong, Taiwan.

The oscillator may be controlled by a computer, wherein calculations are performed by the computer to obtain (estimates of) the properties of the material. The computer may be a desktop or laptop computer, or tablet computer, mobile device, or industrial controller, or other hardware capable of sending control signals to the oscillator and/or receiving measurement signals from the oscillator. It may comprise analogue or digital processing hardware, including one or more FPGA (field programmable gate array) or ASIC (application specific integrated circuit) elements to perform operations such as I/O operations and the estimation of the material properties from the measurements obtained from the oscillator. Some or all of the operations may be performed using electronic hardware or computer modules integrated into the oscillator itself, or may be performed using one or more separate units connected together by wired or wireless interface.

The oscillator has a surface which vibrates at a frequency and amplitude creating a wave which emanates into the fluid in its immediate vicinity. The mode of vibration is either torsional or longitudinal such that a preferred shear wave is generated but a lateral mode of vibration could also be used to generate a compression wave. For simplicity and preference the shear wave is mainly considered here.

A second surface is located a distance away, d, from the emitting surface to define a cavity containing the material to be measured. The cavity does not need to 'capture' the fluid and openings in the arrangement allow the continuous flow of fluid into and out of the cavity so that measurements can be made in a continuously flowing environment in real time.

The wavelength of the shear wave is determined by its frequency and shear velocity.

In an embodiment, the frequency is held constant so the wavelength only varies with wave velocity. The velocity of a shear wave in a fluid is a function of its viscosity and elastic modulus.

The gap length, or distance, d, is chosen so that it is comparable with the length of the transmitted wave, a function of $\alpha^{-1}$, which is dependent on oscillator frequency, $\omega$, and the fluid's density, $\rho$, zero shear viscosity, $\eta_0$, and relaxation time, $\lambda_0$, as written below, where a is the attenuation depth, i.e. the depth at which the amplitude decays to $e^{-1}$—about 37%—of its maximum amplitude.

For an oscillator frequency of around 2 kHz and a high-viscosity Newtonian fluid or a viscoelastic fluid with moderate elasticity, a gap length of typically 2 mm to 5 mm could be sufficient.

From the Upper-convected Maxwell model, the propagation 6 of the shear wave is given by the complex propagation expression:

$$\delta = \alpha + i\beta,$$

where $\alpha = \sqrt{((\rho \cdot \omega / 2\eta_0)(\sqrt{(1+\omega^2 \cdot \lambda_0^2)} - \omega \cdot \lambda_0))}$, and $\beta = \sqrt{((\rho \cdot \omega / 2\eta_0)(\sqrt{(1+\omega^2 \cdot \lambda_0^2)} + \omega \cdot \lambda_0))}$.

(see, for example, Lindley B. S. (2008), "Linear and Nonlinear Shear Wave Propagation in Viscoelastic Media", University of North Carolina at Chapel Hill, Doctoral dissertation available online at https://cdr.lib.unc.edu/record/uuid:75619eb4-18a4-44a6-8ffa-1d2077bb4083).

Thus a reflector may be provided at a location offset by the gap length from the surface of an oscillator.

To measure the quality factor of the oscillator in the definition of quality factor as the ratio of the resonant frequency to the resonant bandwidth is used:

$$Q = (\omega_R)/(\Delta\omega)$$

wherein $\omega_R$ is the resonant frequency in radians per second and $\Delta\omega$ is the Full Width at Half Maximum (FWHM), the bandwidth over which the power of the vibration is greater than half of the maximum (or equivalently the amplitude of vibration is greater than the maximum amplitude at resonance divided by $\sqrt{2}$), i.e. the bandwidth between the 3 dB points. As part of this calculation process $\omega_R$ can be determined explicitly by measurement or by estimate of an intermediate point between the 3 dB points such as a geometric mean of the 3 dB points.

Having obtained a value for Q, this can be applied to a polynomial model for $\eta_0$ of Mw as set out above, using a computer or other processing device, to obtain an estimate of zero shear viscosity or molecular weight, the scaling constants $b_0 \ldots b_n$ and $c_0 \ldots c_n$ having been predetermined by calibration.

Figure 6:
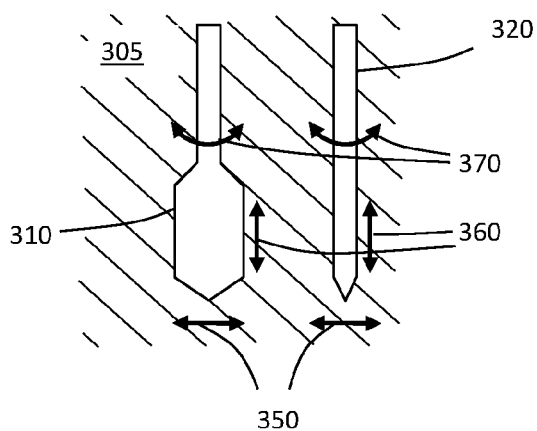
FIG. 6 illustrates bob-type and rod-type mechanical resonator formats oscillating in torsional, longitudinal and lateral modes.

FIG. 6 illustrates a bob-type resonator 310 and a rod-type resonator 320, of which vibrating surfaces are submerged in a fluid 305. Such resonators may be used to implement the techniques of this disclosure. The resonators are shown having possible lateral vibrational modes 350, longitudinal vibrational modes 360, and torsional vibrational modes 370.

Figure 7:
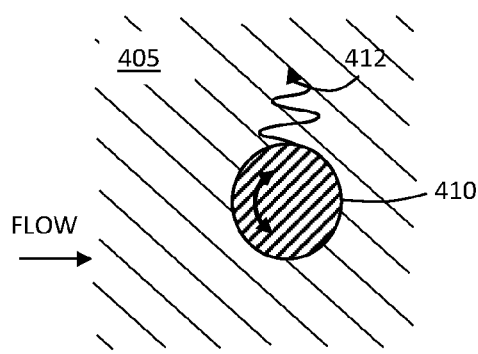
FIG. 7 illustrates shear wave generation in torsional resonator bob section in a semi-infinite medium.

FIG. 7 illustrates the generation of a shear wave 412 by a torsional resonator 410, shown in cross section to have a circular cross section, wherein the fluid 405 is flowing normal to the axis of rotation of the torsional resonator 410.

Figure 8:
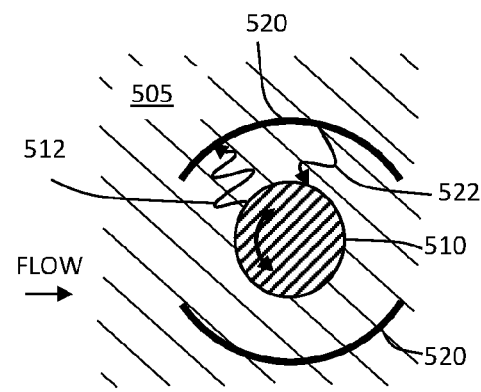
FIG. 8 illustrates cross section of the bob of a torsional resonator with waves transmitted and reflected waves in in cavity formed by reflectors located circumferentially around and partially encircling the bob.

FIG. 8 illustrates a torsional resonator 510 shown in cross section in flowing fluid 505. A cavity is formed between the bob of the torsional resonator 510 and a pair of reflectors 520 located circumferentially around and partially encircling the bob of the torsional resonator 510. The reflectors 520 have arcuate section profiles to provide surfaces that represent portions of a cylindrical shell, concentric with the resonator 510, so that the gap is constant or close to constant (perhaps varying by no more than 20%, more preferably by no more than 10%, more preferably by no more than 5%, more preferably by no more than 1%, of the mean gap distance) around the circumference of the bob of the torsional resonator 510. Transmitted waves 512 are shown generated from the surface of the torsional resonator 510 and reflected waves 522 are shown reflected back toward the torsional resonator 510. The bob of the torsional resonator 510 is not wholly encircled by the reflectors 520; this permits the fluid 505 in the cavity to be replaced by further flowing fluid 505 from upstream.

Figure 9:
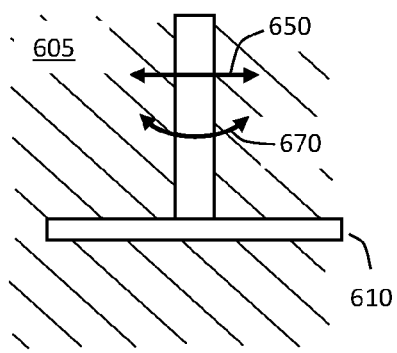
FIG. 9 illustrates a disc mechanical resonator oscillating in torsional and lateral modes.

FIG. 9 illustrates a disc resonator 610 oscillating in a fluid 605 in a lateral vibrational mode 650 and a torsional vibrational mode 670.

Figure 10:
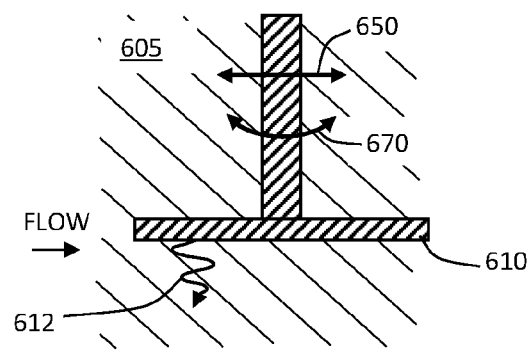
FIG. 10 illustrates a disc mechanical resonator with shear wave generation in torsional and lateral modes in semi-infinite medium.

FIG. 10 illustrates generation of a shear wave 612 by the disc resonator 610 (shown in cross section) in a lateral vibrational mode 650 and a torsional vibrational mode 670, in a semi-infinite medium (i.e. there is no reflection back to the disc resonator 610).

Figure 11:
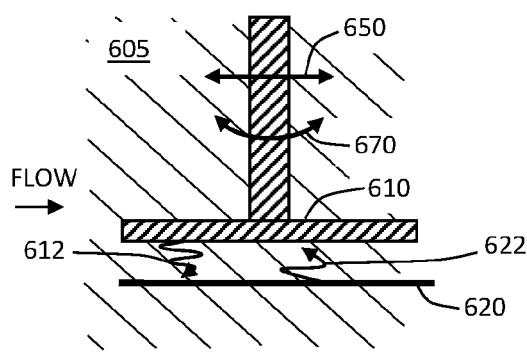
FIG. 11 illustrates a disc mechanical resonator with shear wave generation in torsional and lateral vibrational modes, the waves transmitted and reflected in a cavity formed by a reflector that is coplanar with and offset from the disc.

FIG. 11 illustrates the disc resonator 610 provided with a reflector 620 coplanar to the disc of the disc resonator 610 and offset from it, forming a cavity. Shear waves 612 are generated by the disc resonator 610, operating in a lateral vibrational mode 650 or a torsional vibrational mode 670 (or both) and reflected waves 622 are reflected within the cavity from the reflector 620 back to the disc resonator 610.

Figure 12:
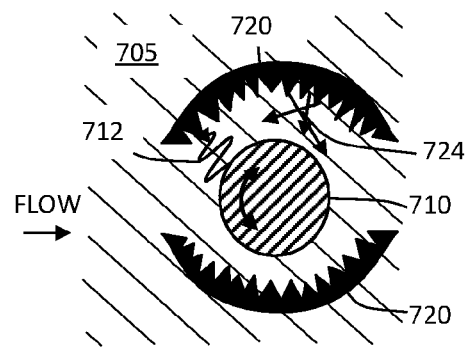
FIG. 12 illustrates reflected wave suppression by frustrated reflector surface, wherein the frustrated reflector surface is located circumferentially around and partially encircling the bob.

FIG. 12 illustrates a torsional resonator 710 shown in cross section in flowing fluid 705. A cavity is formed between the bob of the torsional resonator 710 and a pair of reflectors 720 located circumferentially around and partially encircling the bob of the torsional resonator 710. The reflectors 720 have rough, uneven surfaces, on a scale (depth and width or wavelength and amplitude) such that the shear wave 712 generated at the torsional resonator 710 is not reflected cleanly back from the reflectors 720. The reflected wave 724 is suppressed by the 'frustrated' surface, i.e. it is dispersed or at least partially dispersed.

Figure 13:
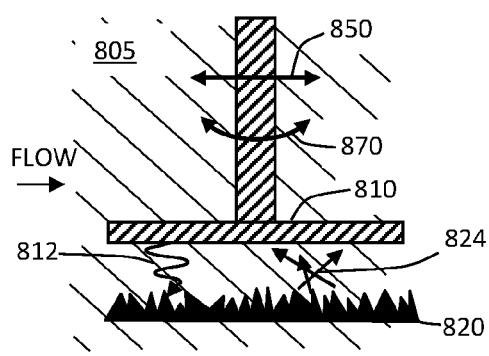
FIG. 13 illustrates reflected wave suppression by frustrated reflector surface that is coplanar with and offset from the disc.

FIG. 13 illustrates a disc resonator 810 oscillating in a fluid 805 in a lateral vibrational mode 850 and/or a torsional vibrational mode 870. A reflector 820 is provided coplanar to the disc surface and offset from it. The reflector 820 also has a 'frustrated' surface facing the disc resonator 810, with irregularities of a scale to cause the irregular scattering/reflection of shear waves, the shear waves 824 reflected back to the disc resonator 810 being suppressed, i.e. the shear waves 824 are dispersed or at least partially dispersed.

Figure 14:
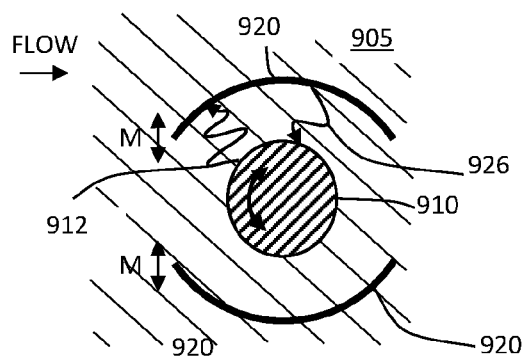
FIG. 14 illustrates a torsional bob resonator with a modulated reflector arrangement, in which waves are transmitted and reflected waves in the cavity formed by the reflectors, the reflectors located circumferentially around and partially encircling the bob, the location of the reflectors relative to the resonator surface being modulated.

FIG. 14 illustrates a torsional resonator 910 shown in cross section in flowing fluid 905. A cavity is formed between the bob of the torsional resonator 910 and a pair of reflectors 920 located circumferentially around and partially encircling the bob of the torsional resonator 910. In this arrangement the locations of the surfaces of the reflectors 920 relative to the bob of the torsional resonator 910 are modulated (modulation indicated by 'M' in FIG. 14). Shear waves 912 are generated at the surface of the bob of the torsional resonator 910, but the phase of the shear wave as it reaches a reflector 920 is not constant. It depends on the position of the reflector 920. This affects the reflected wave 926. The modulation can be periodic. For example, the position of the reflector 920 can be oscillated between positions at a fixed or varying frequency. The modulation may alternatively be aperiodic. In the case of a torsional resonator 910 in which the bob has a circular cross section, the partially encircling reflectors 920 can be moved linearly, or can be moved radially, such that, even as the reflectors change position, the gap distance remains constant or substantially constant (e.g. within 20%, 10%, 5%, or 1% of a mean gap distance). This may be achieved by flexing the reflectors as they are moved linearly—changing the radius of curvature to match the increased or decreased radial position of the reflector 920 so that the reflector surface remains concentric with the surface of the resonator 910, or at least reduces the degree to which the reflector surface is not concentric with the surface of the resonator 910.

Figure 15:
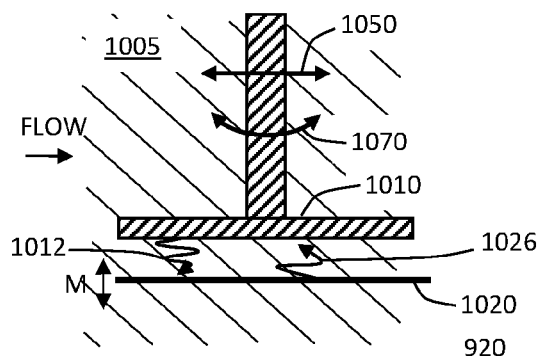
FIG. 15 illustrates a disc mechanical resonator with shear waves transmitted and reflected waves in the cavity formed between the disc surface and the reflector that is coplanar with and offset from the disc, the distance between the disc and the reflector being modulated.

FIG. 15 illustrates a disc resonator 1010 oscillating in a fluid 1005 in a lateral vibrational mode 1050 and/or a torsional vibrational mode 1070. A reflector 1020 is provided coplanar to the disc surface and offset from it. The offset of the reflector 1020 is modulated. A shear wave 1012 is generated at the disc surface and a reflected wave 1026 is returned from the modulated reflector 1020, the reflected wave 1026 varying depending on the position of the reflector surface as it is modulated (modulation indicated by 'M' in FIG. 15).

Figure 16:
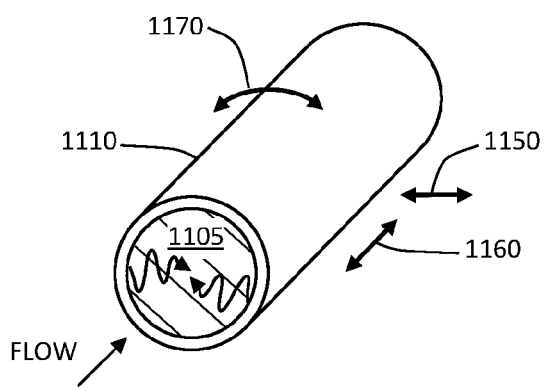
FIG. 16 illustrates incipient wave bridging in a vibrating tube.

FIG. 16 illustrates a vibrating tube resonator 1110 having a fluid 1105 flowing through the tube. The vibrating tube resonator 1110 may vibrate in a lateral vibrational mode 1150, a longitudinal vibrational mode 1160, or a torsional vibrational mode 1170. Shear waves are generated in the fluid 1105 from the interior surface of the vibrating tube resonator 1110. Incipient wave bridging is shown, where the wavelength is at or close to that which would allow for the waves to propagate across the diameter of the tube from one side to the other and interact with counter-propagating waves from the other side.

Figure 17:
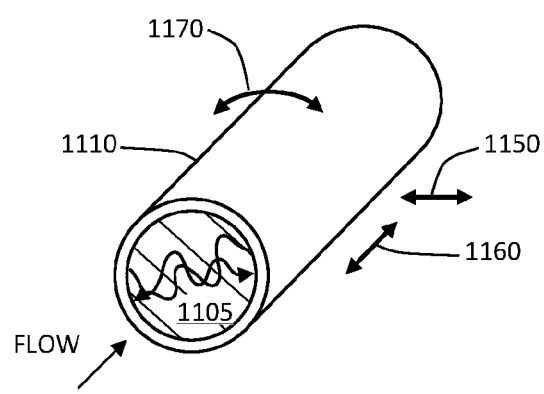
FIG. 17 illustrates diametric wave superposition in a vibrating tube.

FIG. 17 illustrates diametric wave superposition in the vibrating tube resonator 1110.

Embodiments according to this disclosure may additionally or alternatively be described by way of the following numbered clauses:

Clause 1. A mechanical resonator vibrating in either torsional, longitudinal or lateral modes such that a shear wave is generated, and a reflector located at a distance from the resonator to form a cavity such that the wave propagates across the cavity, reflects at the reflector and thereby creates a counter-propagating wave which modulates the energy dissipation in the cavity which is detected as a change in quality factor and frequency of the resonator.

Clause 2. As clause 1, where quality factor is measured using either frequency bandwidth, amplitude, or logarithmic decrement Clause 3. As clause 1, with a compression wave as alternative to shear wave Clause 4. As clause 1, where the resonator can be a rod, bob or disc.

Clause 5. As clause 1, where the reflector has a frustrated surface to prevent efficient reflection of the wave thereby creating an alternative modulation of the quality factor with fluid rheological properties.

Clause 6. As clause 1, where the reflector position is separately modulated to selectively alter the phase of the wave and improve the measurement.

Clause 7. As clause 1, where the resonator is a tube and both the vibrating surface and the reflector is the inside of the tube.

Clause 8. As clause 7, where the wave can propagate freely into the tube and thereby create a standing wave pattern without reaching the diametric opposite wall and still modulate the Q-factor by reducing dissipative shear.

Clause 9. Correlation of measured Q-factor with fluid viscosity and elasticity using any of clauses 1 to 8.

Clause 10. Correlation of measured Q-factor with polymer molecular weight using any of clauses 1 to 8.

Clause 11. Correlation of measured frequency change with fluid viscosity and elasticity using any of clauses 1 to 8.

Clause 12. Correlation of measured frequency change with polymer molecular weight using any of clauses 1 to 8.

Clause 13. A mechanical oscillator vibrating in either torsional, longitudinal or lateral modes such that a shear wave is generated, and a reflector located at a distance from the resonator to form a cavity such that the wave propagates across the cavity, reflects at the reflector and thereby creates a counter-propagating wave which modulates the energy dissipation in the cavity which is detected as a change in stress or strain in the oscillator sensors.

Clause 14. Correlation of measured stress or strain with fluid viscosity and elasticity using clause 13.

Clause 15. Correlation of measured stress or strain with polymer molecular weight using clause 13.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The invention claimed is:

1. A method of determining a material property of a viscoelastic fluid using a vibratory transducer and a reflector spaced from the vibratory transducer to form a cavity for receiving a viscoelastic fluid, the method comprising:

vibrating the vibratory transducer to generate a shear wave in the cavity, the shear wave propagating through a viscoelastic fluid in the cavity from a surface of the vibratory transducer;

reflecting, by the reflector, the shear wave propagated from the surface of the vibratory transducer to generate a counter-propagating shear wave in the cavity, the combination of the shear wave generated at the vibratory transducer and the counter-propagating shear wave generated at the reflector forming a standing wave in the cavity between the surface of the vibratory transducer and the reflector;

determining, based on the shear wave generated at the vibratory transducer and the counter-propagating shear wave generated at the reflector in combination, a quality factor indicative of the energy returned to the vibratory transducer by the reflector; and determining, based on the determined quality factor and a viscoelastic model, one or more material properties of the viscoelastic fluid, the viscoelastic model providing a material property of the viscoelastic fluid as a function of the quality factor.

2. The method of claim 1, wherein the zero shear viscosity of the fluid is determined using the determined quality factor and the viscoelastic model, the viscoelastic model relating the determined quality factor and the zero shear viscosity.

3. The method of claim 2, wherein the viscoelastic model provides an increasing zero shear viscosity with increasing quality factor.

4. The method of claim 1, wherein the molecular weight of the fluid is determined using the determined quality factor and the viscoelastic model, the viscoelastic model relating the determined quality factor and the molecular weight of the fluid.

5. The method of claim 4, wherein the viscoelastic model provides an increasing molecular weight with increasing quality factor.

6. The method of claim 1, wherein the quality factor is determined using one of: frequency bandwidth, amplitude, and logarithmic decrement.

7. The method of claim 1, wherein the viscoelastic fluid is a polymer fluid such as a polymer melt.

8. The method of claim 1, wherein the vibratory transducer is a tube and the interior surface of the tube provides both the vibrating surface and reflector.

9. The method of claim 1, wherein the reflector is provided with a frustrated surface on the cavity interior to reduce the reflection efficiency.

10. The method of claim 1, wherein the position of the reflector is modulated relative to the vibratory transducer to provide a phase adjustment.

11. A device for use with a vibratory transducer and a reflector, the device for determining one or more material properties of a viscoelastic fluid using the vibratory transducer and the reflector spaced from the vibratory transducer to form a cavity for receiving a viscoelastic fluid between the vibratory transducer and the reflector, the device being configured to, based on a vibratory transducer vibrating to generate a shear wave in the cavity, the shear wave propagating through a viscoelastic fluid in the cavity from a surface of the vibratory transducer, the shear wave propagated from the surface of the vibratory transducer being reflected by the reflector to generate a counter-propagating shear wave in the cavity, the combination of the shear wave generated at the vibratory transducer and the counter-propagating shear wave generated at the reflector forming a standing wave in the cavity between the surface of the vibratory transducer and the reflector;

determine, based on the shear wave generated at the vibratory transducer and the counter-propagating shear wave generated at the reflector in combination, a quality factor indicative of the energy returned to the vibratory transducer by the reflector; and determine, based on the determined quality factor and a viscoelastic model, one or more material properties of the viscoelastic fluid, the viscoelastic model providing a material property of the viscoelastic fluid as a function of the determined indication of the energy returned to the vibratory transducer by the reflector.

12. The device of claim 11, further comprising the vibratory transducer and the reflector.

* * * * *